March 27, 1962 A. D. PENN 3,026,993
SPRING BELT DRIVEN CONVEYOR FOR SHEET MATERIALS
Filed Dec. 19, 1958 2 Sheets-Sheet 1

INVENTOR.
ABE D. PENN
BY
ATTORNEYS

INVENTOR.
ABE D. PENN
BY
ATTORNEYS

United States Patent Office 3,026,993
Patented Mar. 27, 1962

3,026,993
SPRING BELT DRIVEN CONVEYOR
FOR SHEET MATERIALS
Abe D. Penn, 140 S. Eudora St., Denver, Colo.
Filed Dec. 19, 1958, Ser. No. 781,669
7 Claims. (Cl. 198—127)

This invention relates to spring belt driven conveyors for sheet materials and, more specifically, to curved sections thereof.

Conveyors especially adapted for the transfer of sheet materials from one place to another are in common use in both the power-driven and gravity types. Straight-line movement of the sheets presents little or no problem; however, these prior art conveyors have been found quite unsatisfactory when curved sections thereof are used to change the direction of movement of the sheets. Generally speaking, large flat sheets have a tendency to move to the outside of curved conveyor sections and fall off rather than change direction as intended. A retaining wall formed on the outside of the curved sections does not solve the problem as the frictional contact of the sheets against the wall causes them to slow down and jam the faster moving sheets coming on to the curved section from an adjoining straight section. By far the most common solution, on the other hand, is to form the curved sections with such a long radius that the movement of the sheets toward the outside of the curve presents no serious problem.

Unfortunately, however, long-radius curves cannot be used in a number of industrial applications nor can gravity-fed conveyors. There is, therefore, an urgent need for a conveyor adapted to carry sheet materials which is power-driven and capable of being formed into tight curves which will effect abrupt changes in direction of articles supported thereon without danger of their falling off.

Accordingly, it is the principal object of the present invention to provide a spring belt-driven curved conveyor especially adapted for use in transporting sheet materials.

A second object of the invention is the provision of a conveyor of the type described which can be formed into short-radius curves, yet which does not shift the sheets carried thereby toward the outside of the curve.

Another objective is to provide a curved sheet conveyor section in which each of the roller elements thereof is driven by spring belts operatively interconnecting the adjacent roller elements.

Still another object of the invention is the provision of a belt-driven sheet conveyor which is designed to move the materials conveyed thereon at substantially the same rate of speed over both the straight and curved sections thereof.

Additional objects of the invention are to provide a spring belt-driven curved conveyor which is simple, relatively inexpensive, easy to service, rugged, and capable of handling a wide variety of flat sheet materials.

Other objects will be in part apparent and in part pointed out specifically hereinafter in connection with the description of the drawings that follow, and in which.

Figure 1:
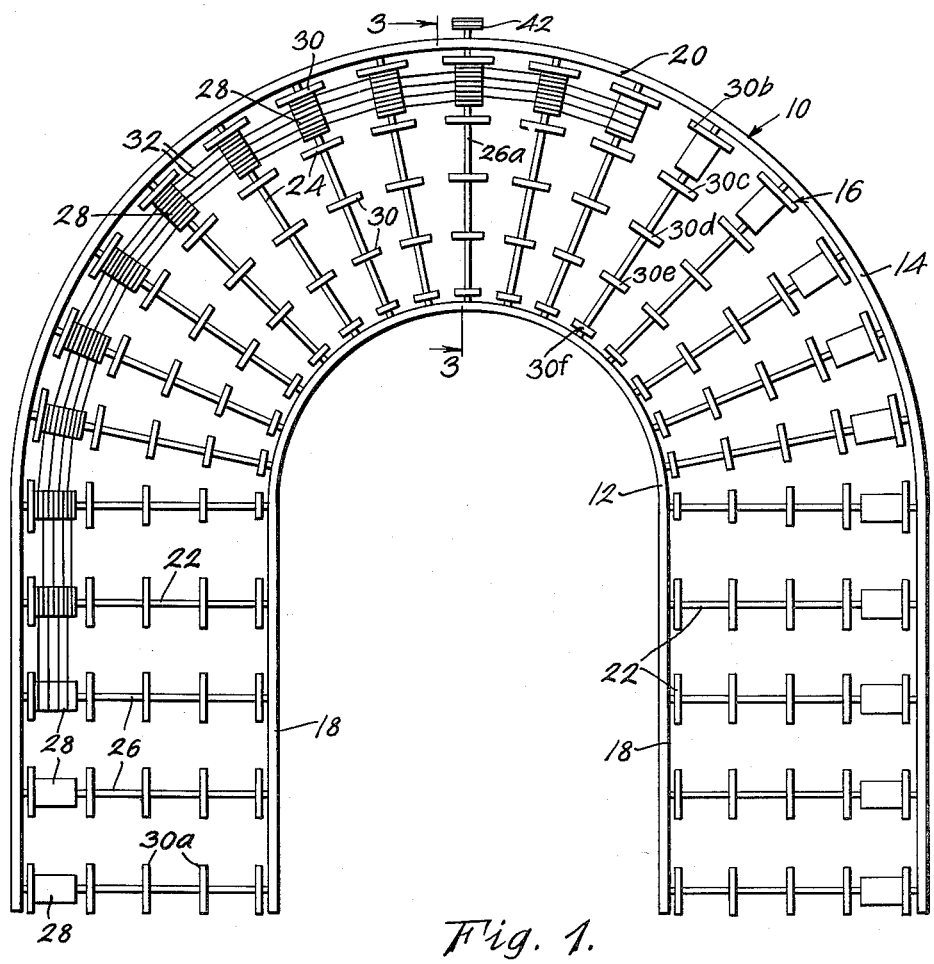
FIGURE 1 is a top plan view of a curved section of the spring belt-driven sheet conveyor of the present invention.
Figure 2:
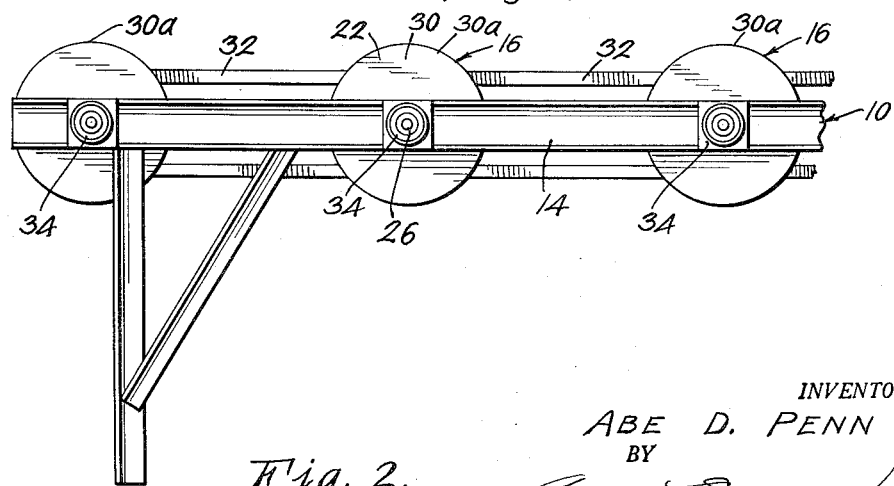
FIGURE 2 is a fragmentary side elevation thereof to an enlarged scale.

Referring now to the drawing, and in particular to FIGURE 1 thereof, the spring belt-driven sheet conveyor of the present invention will be seen to include a frame 10 having inside and outside rails 12 and 14, respectively, between which are journalled for rotation a plurality of longitudinally spaced roller elements indicated generally by numeral 16. As illustrated in FIGURE 1, a pair of straight sections 18 have been shown arranged in spaced, side-by-side relation with the adjacent ends thereof interconnected by a curved section 20. The inside and outside rails 12 and 14 of the frame 10 are located in spaced substantially parallel relation to one another while the cylindrical roller elements 22 of the straight sections 18 are likewise parallel but perpendicular to said rails. In the curved section 20, on the other hand, the tapered roller elements 24 are not parallel to one another but project radially from the center of curvature.

Each of the roller elements 16 comprises a shaft 26 having a grooved roller 28 attached to one end thereof and a plurality of disks 30 spaced along the length thereof. Spring belts 32 operatively interconnect the grooved roller 28 of each roller element 16 with the grooved rollers of the adjacent roller elements on opposite sides thereof.

With reference now to the remaining figures of the drawing, it will be seen that the siderails 12 and 14 of the frame 10 in the particular form shown are channel-shaped and bearings 34 are attached thereto in which opposite ends of the roller shafts 26 are journalled for rotation. The grooved rollers 28 are generally cylindrical and each contains a plurality of concave semi-circular grooves 36 of a width approximately equal to the outside diameter of spring belts 32. Grooves 36 are arranged in side-by-side parallel relation on the rollers 28 and extend completely around the periphery thereof.

Spring belts 32 comprise continuous close-wound coiled tension springs which are stretched slightly and passed around aligned pairs of grooves 36 in adjacent rollers 28. All of the grooved rollers 28 are preferably of the same diameter so that their respective shafts 26 will be driven at the same speed. The preferred driving connection is such that alternate spring belts 32 extend in opposite directions from a given grooved roller. In other words, half of the spring belts connect an intermediate roller with the following roller while the other half connect the intermediate roller with the lead roller and all of the belts are arranged in alternating relation so that one extends rearwardly, the next forwardly, etc.

The roller elements 16 are, therefore, operatively interconnected to one another by means of spring belts 32 and grooved rollers 28. Power to turn the several roller elements 16 is derived from a motor 38 operatively interconnected to the extended end 40 of elongated roller shaft 26a of roller element 16a by means of a chain and sprocket drive indicated generally by numeral 42 and shown most clearly in FIGURE 3. One or more sections of the conveyor may thus be driven from a common power source depending upon the loads to be carried.

Figure 3:
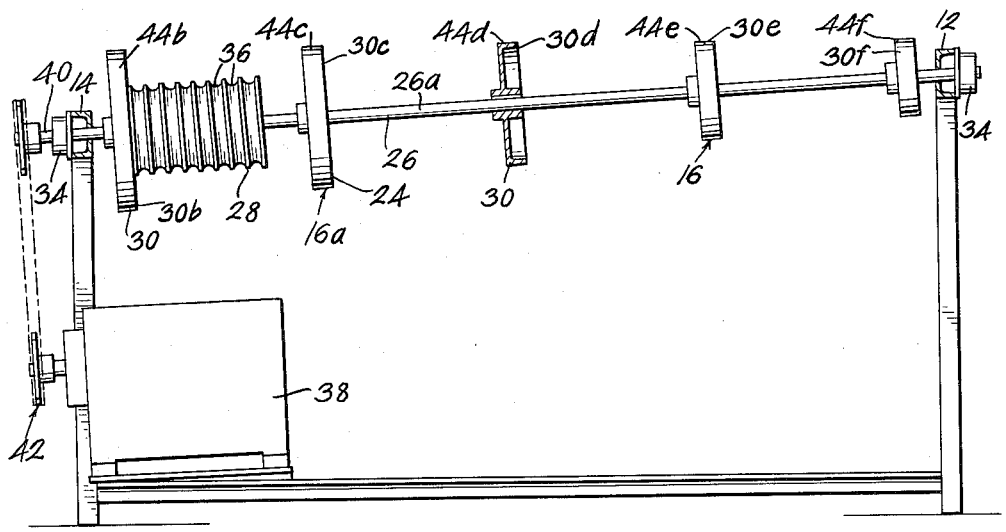
FIGURE 3 is a transverse section taken along line 3—3 of FIGURE 1.
Figure 4:
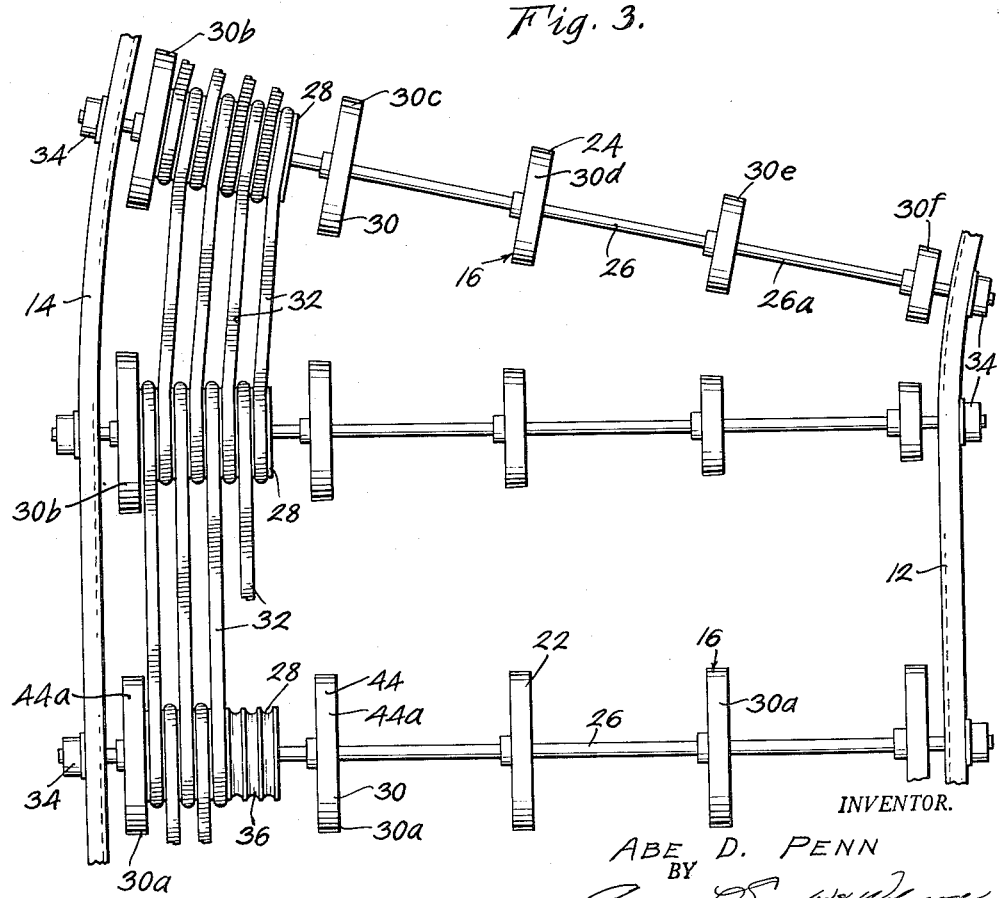
FIGURE 4 is an enlarged fragmentary top plan view showing the details of the spring belt drive between the roller elements.

In FIGURES 3 and 4 of the drawing, it can be seen that the cylindrical roller elements 22 of the straight conveyor sections 18 are each provided with several longitudinally spaced disks or wheels 30a of the same diameter and which are formed to include an annular cylindrical rim 44 around the periphery thereof that engages the underside of the sheet materials to be transported thereon. The shafts 26 of the cylindrical roller elements on the straight sections are substantially horizontal and the sheet materials, are therefore, moved along the conveyor in a horizontal plane tangent to the rims 44 of the disks 30a. The curved section 20 of the conveyor includes a somewhat different design in that tapered roller elements 24 are used in place of cylindrical rollers 22. These tapered roller elements 24 include a plurality of longitudinally spaced disks or wheels 30b–30f, inclusive, that decrease in diameter incrementally from the outside of the curve to the inside thereof. In addition, the rims 44b–44f, inclusive, on the periphery thereof comprise frusto-conical sections of a right circular cone having the shaft 26a as its axis. Shaft 26a is mounted between the siderails 12 and 14 in inclined relation to the horizontal such that the rims 44b–44f lie tangent to a horizontal plane in the same manner as rims 44a of wheels 30a. Disks 30a and 30b are substantially the same diameter and differ from one another only in the cylindrical and frusto-conical shapes of their respective rims 44a and 44b; therefore, their peripheral velocities remain substantially equal and a sheet conveyed thereon will have the outside edge thereof moved at the same rate on both the straight and curved sections 18 and 20 of the conveyor. The peripheral velocities of disks 30c–30f, inclusive, on the other hand, are substantially less than that of disks 30a and 30b which means, of course, that the inside edge of the sheet will move more slowly than the outside edge causing it to turn the corner.

Having thus described the several useful and novel features of the spring belt-driven conveyor for sheet materials of the present invention, it will be seen that the many worthwhile objectives for which it was designed have been achieved. Although but one specific form of the invention has been illustrated in the accompanying drawings, I realize that certain changes and modifications therein may occur to those skilled in the art within the broad teaching found herein; hence, it is my intention that the scope of protection afforded hereby shall be limited only insofar as said limitations are expressly set forth in the appended claims.

What is claimed is:

1. In a conveyor for sheet materials and the like, a pair of spaced substantially parallel straight and curved connected siderails in longitudinally spaced relation a plurality of shafts positioned between the curved siderails in angular relation to one another, a plurality of shafts positioned between the straight siderails in parallel relation to one another, a multi-grooved cylindrical roller attached to each shaft adjacent the outside rail for conjoint rotation therewith, a plurality of endless spring belts interconnecting each grooved roller with the adjacent roller on one side thereof, a plurality of other endless spring belts interconnecting each grooved roller with the adjacent roller on the other side thereof, a plurality of rimmed wheels arranged in axially spaced relation along each shaft for conjoint rotation therewith, with those wheels on shafts positioned between the straight siderails having rims of constant diameter and those wheels on shafts positioned between the curved siderails having rims decreasing in diameter from the outside rail to the inside rail with the rims shaped to form frusto-conical sections of a common right circular cone, and drive means operatively connected to at least one of the shafts for effecting rotation thereof and the other shafts through the endless spring belts to turn the wheels and their rims in sheet supporting relation including direct driving means operatively interconnecting the rollers of at least one shaft positioned between the straight siderails and one shaft positioned between the curved siderails.

2. The conveyor as set forth in claim 1 in which the shafts are journalled for rotation in a common inclined plane located such that the frusto-conical rims of the several wheels will be tangent to a horizontal plane resting on top thereof.

3. In a conveyor for sheet materials and the like, a pair of spaced substantially parallel straight and curved connected siderails, a plurality of shafts journalled for rotation between the curved siderails in longitudinally spaced relation shafts between the curved siderails in angular relation to one another, a plurality of shafts journalled for rotation between the straight siderails, a multi-grooved cylindrical roller attached to each shaft adjacent the outside rail for conjoint rotation therewith, a plurality of endless spring belts interconnecting each grooved roller with the adjacent roller on one side thereof, a plurality of other endless spring belts interconnecting each grooved roller with the adjacent roller on the other side thereof, a plurality of rimmed wheels arranged in axially spaced relation along each shaft for conjoint rotation therewith and drive means operatively connected to at least one of the shafts for effecting rotation thereof and the other shafts through the endless spring belts to turn the wheels and their rims in sheet-supporting relation wherein the shafts extending between opposed straight siderails are arranged in spaced substantially parallel relation to one another, the shafts extending between opposed curved siderails are arranged in angular relation to one another, the wheels on each of the parallel shafts having rims of equal diameter and the wheels on each of the skewed shafts having rims that decrease in diameter incrementally from the outside rail to the inside rail with the rims shaped to form frusto-conical sections of a common right circular cone including direct drive means operatively interconnecting the rollers of a shaft journalled for rotation between the curved siderails and a shaft journalled for rotation between the straight siderails.

4. The conveyor as set forth in claim 3 in which the rims of all the wheels are located tangent to a common horizontal plane resting on top thereof.

5. The conveyor as set forth in claim 3 in which the diameter of each of the largest frusto-conical rimmed wheels is substantially equal to the diameter of the cylindrically-rimmed wheels.

6. The conveyor as set forth in claim 4 in which the diameter of each of the largest frusto-conical rimmed wheels is substantially equal to the diameter of the cylindrically-rimmed wheels.

7. The conveyor as set forth in claim 6 in which the grooved rollers are of the same diameter and located in the same transverse relation between the siderails.

References Cited in the file of this patent

UNITED STATES PATENTS

| | | |
|---|---|---|
| 395,978 | Hyman | Jan. 8, 1889 |
| 498,323 | Storle | May 30, 1893 |
| 1,756,653 | McArthur | Apr. 29, 1930 |
| 2,683,523 | Rottersmann | July 13, 1954 |